July 14, 1970     G. P. C. ROBERT ET AL     3,520,653
MANUFACTURE OF SODIUM PHOSPHATE
Filed June 30, 1967
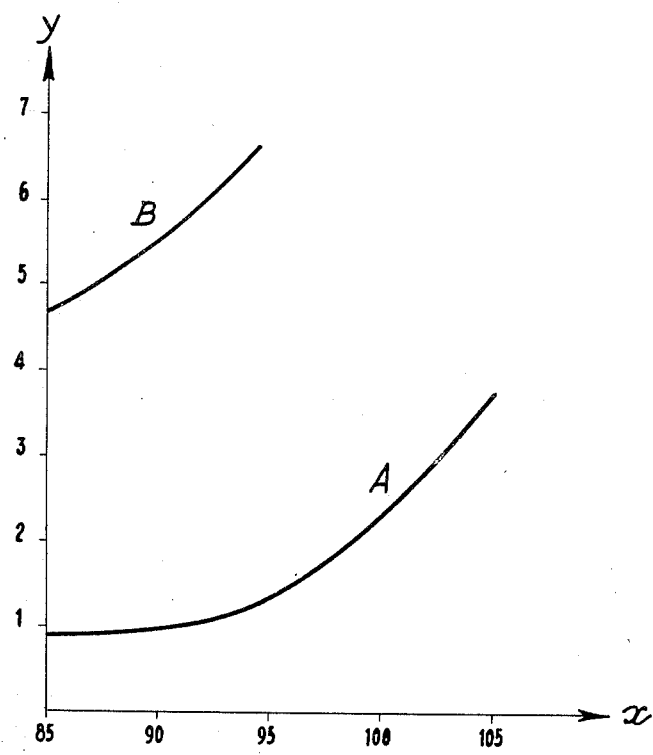
INVENTORS
Germaine Pauline Caroline Robert
Robert Oscar Bauwens
BY
ATTORNEYS United States Patent Office 3,520,653
Patented July 14, 1970

3,520,653
MANUFACTURE OF SODIUM PHOSPHATE
Germaine Pauline Caroline Robert, Levallois-Perret, and Robert Oscar Bauwens, Colombes, France, assignors to Societe Anonyme: Ugine Kuhlmann, Paris, France, a corporation of France
Filed June 30, 1967, Ser. No. 650,516
Claims priority, application France, July 1, 1966, 67,903
Int. Cl. C01b 25/22, 25/30
U.S. Cl. 23—107
7 Claims

ABSTRACT OF THE DISCLOSURE

A method for the manufacture of a solution of sodium phosphate and phosphoric acid containing not more than 1.5 gm. $SO_4$ content per 100 gm. $P_2O_5$ which comprises reacting a phosphate rock with a phosphoric acid having a concentration of at least 38% $P_2O_5$, said phosphoric acid selected from the group consisting of phosphoric acid per se and phosphoric acid produced in situ from concentrated sulfuric acid and mixtures of concentrated sulfuric acid and phosphoric acid, in the presence of sodium sulfate in such an amount that the amount of $SO_4^{--}$ present in the reaction mixture is not more than 95 gm. per 100 gm. of said phosphate rock, at a temperature between about 50° C. and 95° C. for a time sufficient to form a solution of sodium phosphate and phosphoric acid and a solid calcium sulfate hemihydrate which contains and retains sodium sulfate particularly during water washing, separating said solid calcium sulfate hemihydrate and recovering a solution of sodium phosphate and phosphoric acid containing not more than 1.5 gm. $SO_4^{--}$ per 100 gm. $P_2O_5$.

---

It is known that sodium sulfate available as byproduct of certain manufacturing processes may be used to obtain sodium phosphate. Sodium sulfate may in practice be used in two different reactions for the production of sodium phosphate from phosphate rock. The formula ($4CaO.P_2O_5$) will be used hereinafter to designate phosphate rock but it should be understood that the same considerations apply to phosphate rock corresponding to other formulae.

First, sodium sulfate may be introduced when phosphate rock is reacted with sulfuric acid according to the following equation:

(1) 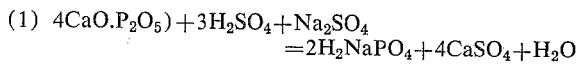

$$4CaO.P_2O_5 + 3H_2SO_4 + Na_2SO_4 = 2H_2NaPO_4 + 4CaSO_4 + H_2O$$

Second, sodium sulfate may be used in the further reaction of phosphate rock with previously prepared phosphoric acid, according to the following equation:

(2) 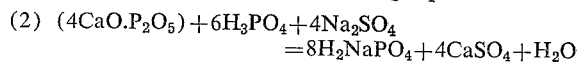

$$4CaO.P_2O_5 + 6H_3PO_4 + 4Na_2SO_4 = 8H_2NaPO_4 + 4CaSO_4 + H_2O$$

In both cases, when operating with acid in sufficient excess, a solution is obtained containing a mixture of free phosphoric acid and monobasic sodium phosphate, which may readily be finally neutralized to yield only monobasic sodium phosphate.

Such a method is theoretically appealing since, compared to the conventional method of obtention of sodium phosphate from phosphate rock, it decreases the requirement of both sulfuric acid, and sodium carbonate.

In practical operation however a serious drawback is met with, since the solutions obtained when using sulfuric or phosphoric acid concentrations of the usual concentrations (corresponding to phosphoric acid at 28–30% $P_2O_5$) are always rich in $SO_4^{--}$ ions. Solutions are thus currently obtained which contain 4 to 5 gm. of $SO_4^{--}$ ions per 100 gm. of $P_2O_5$, which prevents their use in many cases, more particularly for the manufacture of sodium tripolyphosphate for which the purity standards are very strict.

The sodium phosphate solutions which can be obtained according to the prior art must therefore be submitted to a further desulfurization, at least for certain uses. This operation is much more difficult than the desulfurization of phosphoric acid and requires costly reactants such as barium salts, since calcium salts, which are cheaper, do not lead to a complete desulfurization because of the equilibrium which is established during the precipitation.

OBJECT OF THE INVENTION

The main object of the present invention is to provide a method by which sodium phosphate solutions can be directly obtained, having a sufficiently low $SO_4^{--}$ content to be used without further treatment.

DESCRIPTION OF THE INVENTION

The method according to the invention basically consists in reacting phosphate rock in the presence of sodium sulfate with sulfuric or phosphoric acid having a sufficiently high concentration, corresponding to at least 38% $P_2O_5$, at temperatures comprised between about 50° C. and 95° C. This process leads to precipitation of calcium sulfate as a hemihydrate which hemihydrate is directly filtered out and a sodium phosphate solution having a low $SO_4^{--}$ content is recovered.

As above mentioned the method of the invention may be applied directly to the reaction of phosphate rock with sulfuric acid the concentration of which, hereinabove defined as corresponding to at least 38% $P_2O_5$, being that which would lead to the obtention of phosphoric acid titrating at least 38% $P_2O_5$, preferably 38 to 40% $P_2O_5$, in the conventional method for the obtention of phosphoric acid by reaction of phosphate rock with sulfuric acid. The reaction is then the above mentioned reaction (1).

The method of the invention more simply applies to the reaction of phosphate rock with previously prepared concentrated phosphoric acid titrating over 38% $P_2O_5$, for example 38 to 40% $P_2O_5$. The reaction is then the above mentioned reaction (2). The operation is simplified in this case since the quantity of calcium sulfate hemihydrate which has to be filtered out is less than in the case of a direct reaction with sulfuric acid.

The method also applies to the use of mixtures of sulfuric and phosphoric acid, at concentrations corresponding to what has been explained hereinabove.

Generally speaking, the reactions are conducted at temperatures from 50 to 95° C., preferably 55 to 80° C.

Further features of the invention as well as the advantages deriving therefrom are described hereinafter.

In the above mentioned reaction conditions, calcium sulfate precipitates as hemihydrate instead of gypsum, as is the case when phosphate rock is reacted with phosphoric acid of lower concentrations, for instance at 28–30% $P_2O_5$.

It should be noted that the precipitated hemihydrate is quite different from the product which is obtained, for instance, in the conventional manufacture of concentrated phosphoric acid.

The graph relates to the $SO_4^{--}$ content of various solutions obtained by acidic treatment of phosphate rock in the presence of sodium sulfate.

The hemihydrate precipitate obtained in the conditions of the method according to the invention is unique in that it is capable of fixing, when it forms, a proportion of sodium sulfate which may be very high. Furthermore said hemihydrate can be readily filtered out and washed without sodium sulfate then carried off, which makes it possible to directly obtain sodium phosphate solutions having a low concentration of sulfate ions. Thus the $SO_4^{--}$ content of the phosphate solution separated by filtration from said hemihydrate in the method according to the invention and of the further solution resulting from a quick methodic washing by means of water, of the hemihydrate on the filter is not higher than 1 gm. to 1.5 gm. per 100 gm. of $P_2O_5$.

It is not precisely known at this time under what form the sodium sulfate is retained in the hemihydrate precipitate, and further theoretical considerations should not be considered as limiting the scope of the invention. It has however been verified that the state of said sodium sulfate does not correspond to a simple crystallization resulting from saturation of the solution. In any case, the presence of sodium sulfate (under one form or another) in the precipitate has been unquestionably shown. For example, sodium sulfate can be freed and extracted from said precipitate. The sodium sulfate content of said precipitate can be very high.

It should also be noted that the method of the invention provides a direct filtration for separating the hemihydrate from the reaction medium. It is not possible to proceed for example with an intermediary hydration of the hemihydrate to gypsum after adding water, since the $SO_4^{--}$ content of the solution would immediately increase. The direct filtration of the hemihydrate is furthermore advantageous, because this filtration as well as the washing of the filter cake are very easy. Also, the separated hemihydrate does not set as a mass of gypsum but remains very friable when dried.

A further favorable result obtained when operating according to the invention is that there is an essential difference between the action of phosphoric acid at lower concentrations, such as for example 28–30% $P_2O_5$ in accordance with the prior art, and that of phosphoric acid of higher concentrations, say 38–40% $P_2O_5$, used according to the invention. When acid of low concentration is used the $SO_4^{--}$ content of the final solution obtained varies according to the quantity of $SO_4^{--}$ ions originally present in the reaction. On the contrary, when operating with more concentrated acid according to the invention, the hemihydrate precipitate operates as a kind of buffer and retains increasing quantities of $SO_4^{--}$ as the original quantity of such ions is increased in the reaction medium, whereas the $SO_4^{--}$ content in the final solution varies very little, at least when said original quantity is comprised between about 85 and 95 parts per 100 parts of $P_2O_5$, by weight.

The curves shown in the graph of the drawing illustrate the said result. In the graph the quantities of $SO_4^{--}$ introduced in the reaction are plotted in the abscissae ($x$) in gm. per hundred gm. of phosphate rock and the quantities of $SO_4^{--}$ are plotted as ordinates ($y$) in gm. per 100 gm. $P_2O_5$ in the final sodium phosphate solution. The curve (A) correspond to a reaction with phosphoric acid at 39% $P_2O_5$ and curve (B) to a reaction with phosphoric acid at 28% $P_2O_5$.

It should be noted that this particular feature is most advantageous when the concentration of $SO_4^{--}$ in the phosphoric acid used for the reaction varies slightly from one batch to another, which is often the case.

The use of sodium sulfate has the further advantage of producing a sodium phosphate solution which is substantially free from silica and fluorine because of the well known reaction:

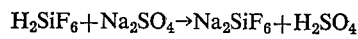

$$H_2SiF_6 + Na_2SO_4 \rightarrow Na_2SiF_6 + H_2SO_4$$

In the reaction according to the invention the greater part of the sodium fluosilicate obtained remains insolubilized in the hemihydrates the remainng part readly precipitating when the solution is cooled. Then, the residual fluorine content may be of the order of, say, 0.2–0.3% by weight of $P_2O_5$ in the cold solutions, or 1.0–1.3% in the hot solutions whereas the corresponding fluorine content in a cold acid solution obtained without sodium sulfate is 5.7%.

The following examples relate to reactions carried out according to the invention with phosphoric acid.

The reactions were in the first three examples carried out at 60° C. with the following starting materials:

Solid mixture:
  75% moroccan phosphate rock ground as for the manufacture of superphosphate
  Powdered sodium sulfate (32.7% $Na_2SO_4$)

Phosphoric acid at 38–39% $P_2O_5$: Free $SO_4^{--}$ content =1.8 gm. per 100 gm. $P_2O_5$.

Example I

The reaction was carried out in a continuous process by feeding a reactor containing a well stirred previous reaction mixture, with:

793 gm. per hr. of solid mixture, and
893 gm. per hr. $P_2O_5$ in the form of phosphoric acid at 39% $P_2O_5$.

A quantity of water of the order of 440 gm. per hr. was simultaneously introduced, said quantity being calculated for conveniently diluting the $P_2O_5$ solubilized during the reaction, procuring the necessary quantity of hydration water corresponding to the hemihydrate, and compensating for evaporation.

Said addition of water was used to further introduce a small additional quantity of sodium sulfate, to obtain finally a total quantity of $SO_4^{--}$ ($SO_4^{--}$ in phosphoric acid + $SO_4^{--}$ in $Na_2SO_4$) of 89 gm. per 100 gm. of rock.

The reaction was carried out at 60° C., the mixture remaining 3 hrs. 15 min. in the reactor.

The slurry flowing out from the reactor was filtered under vacuum (filter cake thickness 20 mm.).

The precipitate was then methodically washed on the filter, first three times with recycled wash water resulting from previous cycles, then with tap water. The quantity of liquid used for each washing corresponded substantially to 270 ml. per kg. of slurry. The washings were carried out at about 70° C.

The filtration times varied between 2 minutes and 30 seconds according to the number of previous washings. There was thus obtained:

(1) A filtered solution containing:
  $P_2O_5$=36.5%
  $SO_4^{--}$=0.96 gm. per 100 gm. $P_2O_5$
  CaO=1.35 gm. per 100 gm. $P_2O_5$ (2) A washing solution which was added to the said first solution and containing:
  $P_2O_5$=36%
  $SO_4^{--}$=1.05 gm. per 100 gm. $P_2O_5$
  CaO=1.5 gm. per 100 gm. $P_2O_5$ The determination of $P_2O_5$ retained in the filter cake showed that the total loss of $P_2O_5$ (loss during the reaction + loss during washing) amounted to 1.1% of the total $P_2O_5$ employed.

The examination of the hemihydrate retained on the filter (evaluation of the hydration degree and study of the X-ray diffraction spectrum) showed that it was partially hydrated during the successive washings. However, it remained easy to handle.

Part of said water-containing hemihydrate was allowed to stand in the air for more than 1 month. At the end of this period it was covered with a layer of sodium sulfate but it remained very friable although completely converted to gypsum.

Example II

The same reaction was carried out as in Example I with the difference that the quantity of $SO_4^{--}$ used (account being taken of the $SO_4^{--}$ content in the phosphoric acid) was 94 gm. per 100 gm. of rock.

The slurry was filtered and the precipitate washed as in Example I.

There was obtained:

(1) A filtered solution containing:
   $P_2O_5 = 36$ to $37\%$
   $SO_4^{--} = 1.3$ gm. per 100 gm. $P_2O_5$
   $CaO = 1.05$ gm. per 100 gm. $P_2O_5$ (2) A washing solution which was added to the said first solution and containing:
   $P_2O_5 = 36\%$
   $SO_4^{--} = 1.3$ gm. per 100 gm. $P_2O_5$
   $CaO = 1.05$ gm. per 100 gm. $P_2O_5$ The total loss of $P_2O_5$ was of the order of 1% with respect to the total $P_2O_5$ originally used.

The hemihydrate, dried as in Example I, remained perfectly friable.

Example III

The reaction of Example I was repeated, but the quantity of $SO_4^{--}$ introduced was 84.5 gm. per 100 gm. of rock.

There was obtained:

(1) A filtered solution containing:
   $SO_4^{--} = 0.85$ gm. per 100 gm. $P_2O_5$
   $CaO = 2.15$ gm. per 100 gm. $P_2O_5$ (2) A washing solution which was added to the said first solution and containing:
   $SO_4^{--} = 0.8$ gm. per 100 gm. $P_2O_5$
   $CaO = 2.2$ gm. per 100 gm. $P_2O_5$ The total loss of $P_2O_5$ amounted to 2% with respect to the total $P_2O_5$ used.

Example IV

Sulfuric acid of 66° Bé., together with phosphoric acid containing about 30% $P_2O_5$, was used for the initial reaction, instead of phosphoric acid at 39% $P_2O_5$.

The processing was substantially the same as in Example I, the starting materials fed to the reactor being:

793 gm. per hr. of the solid mixture of the other examples
925 gm. per hr. of supplemental phosphate rock
720 gm. per hr. $H_4SO_2$ of 66° Bé.
2100 gm. per hr. phosphoric acid at 29.3% $P_2O_5$
440 gm. per hr. water with additional $Na_2SO_4$ The total quantity of $SO_4^{--}$ introduced was 89 gm. per 100 gm. of rock in the solid mixture.

The reaction was carried out at 70° C., the mixture remaining 3 hrs. 30 min. in the reactor.

The slurry flowing out from the reactor was filtered under vacuum and the filter cake washed as in Example I. The filtration lasted five times longer than in Example I because of the greater quantity of hemihydrate which formed.

The final results were substantially the same as in Example I.

What we claim is:

1. A method for the manufacture of a solution of sodium phosphate and phosphoric acid containing not more than 1.5 gm. $SO_4$ content per 100 gm. $P_2O_5$ which comprises reacting a phosphate rock with a phosphoric acid having a concentration of at least 38% $P_2O_5$, said phosphoric acid selected from the group consisting of phosphoric acid per se and phosphoric acid produced in situ by reacting said phosphate rock with concentrated sulfuric acid and mixtures of concentrated sulfuric acid and phosphoric acid, in the presence of sodium sulfate in such an amount that the amount of $SO_4^{--}$ present in the reaction mixture is not more than 95 gm. per 100 gm. of said phosphate rock, at a temperature between about 50° C. and 95° C. for a time sufficient to form a solution of sodium phosphate and phosphoric acid and a solid calcium sulfate hemihydrate which contains and retains sodium sulfate particularly during water washing, separating said solid calcium sulfate hemihydrate and recovering a solution of sodium phosphate and phosphoric acid containing not more than 1.5 gm. $SO_4^{--}$ content per 100 gm. $P_2O_5$.

2. A method as claimed in claim 1, in which the reaction is carried out at a temperature from 55 to 80° C.

3. A method, as claimed in claim 1, in which said phosphoric acid has a concentration of between 38% and 40% of $P_2O_5$.

4. A method, as claimed in claim 1, in which said phosphoric acid is phosphoric acid per se.

5. A method, as claimed in claim 1, in which said phosphoric acid is phosphoric acid produced in situ by reacting said phosphate rock with mixtures of concentrated sulfuric acid and phosphoric acid.

6. A method, as claimed in claim 1, in which said phosphoric acid is phosphoric acid produced in situ by reacting said phosphate rock with concentrated sulfuric acid.

7. A method, as claimed in claim 1, in which the amount of $SO_4^{--}$ present in the reaction mixture is from 85 gm. to 95 gm. per 100 gm. of said phosphate rock.

References Cited

UNITED STATES PATENTS

| Re. 20,994 | 1/1939 | Larsson | 23—165 |
| 2,021,699 | 11/1935 | Preisman | 23—107 |
| 1,747,588 | 2/1930 | Lohmann | 23—107 |
| 2,036,244 | 4/1936 | Wadsted et al. | 23—107 |
| 2,885,263 | 5/1959 | Peet | 23—165 |
| 2,885,264 | 5/1959 | Peet | 23—165 |

FOREIGN PATENTS 301,864    1930    Great Britain.

OSCAR R. VERTIZ, Primary Examiner

G. A. HELLER, Assistant Examiner

U.S. Cl. X.R.

23—122, 165